United States Patent
Mouannes

[11] Patent Number: 5,925,264
[45] Date of Patent: Jul. 20, 1999

[54] METHOD AND APPARATUS FOR DETECTING SURFACE CONTAMINATION IN A WELD AREA

[75] Inventor: Elie E. Mouannes, Chomedey, Canada

[73] Assignee: Ball Corporation, Broomfield, Colo.

[21] Appl. No.: 08/843,399

[22] Filed: Apr. 15, 1997

Related U.S. Application Data

[51] Int. Cl.⁶ .................................................. B23K 11/24
[52] U.S. Cl. .............................................. 219/110; 219/64
[58] Field of Search ...................... 219/110, 109, 219/64

[56] References Cited

U.S. PATENT DOCUMENTS

| | | | |
|---|---|---|---|
| 2,996,604 | 8/1961 | Lemson et al. | 219/110 |
| 4,242,561 | 12/1980 | Long | 219/109 |
| 4,289,948 | 9/1981 | Jurek et al. | 219/110 |
| 4,306,138 | 12/1981 | Tokunaga et al. | 219/114 |
| 4,343,980 | 8/1982 | Stanya et al. | 219/110 |
| 4,410,781 | 10/1983 | Riviere | 219/64 |
| 4,449,028 | 5/1984 | Buxton | 219/109 |
| 4,459,456 | 7/1984 | Jurek et al. | 219/110 |
| 4,554,430 | 11/1985 | Belamaric | 219/108 |
| 4,572,937 | 2/1986 | Opprecht et al. | 219/83 |
| 4,595,326 | 6/1986 | Matsuno et al. | 413/1 |
| 4,677,272 | 6/1987 | Tajiri | 219/110 |
| 4,714,816 | 12/1987 | Pazzaglia | 219/109 |
| 4,868,364 | 9/1989 | Kawano et al. | 219/110 |
| 4,939,355 | 7/1990 | Mueller | 219/109 |
| 4,940,873 | 7/1990 | Davies | 219/84 |
| 4,999,477 | 3/1991 | Yamaguchi et al. | 219/110 |
| 5,089,682 | 2/1992 | Davies | 219/84 |
| 5,296,078 | 3/1994 | Frey | 156/466 |
| 5,313,041 | 5/1994 | Levy et al. | 219/109 |
| 5,523,541 | 6/1996 | Ishikawa | 219/110 |

*Primary Examiner*—Clifford C. Shaw
*Attorney, Agent, or Firm*—Sheridan Ross P.C.

[57] ABSTRACT

An apparatus/method for detecting contamination during welding is disclosed. In one embodiment, contamination is detected during the welding of overlapping metal portion used in the production of can bodies. The apparatus monitors the voltage supplied to a welding electrode during welding. When the voltage increases above a predetermined level, which may indicate the presence of contamination, the electrical energy is directed away from the welding roller before the rollers pass the area of contamination. The diverted electrical energy is directed to a short circuiting device, such as a parallel combination of silicon control rectifiers. As such, the electrical energy may be directed away from the welding rollers to prevent damage to the rollers.

20 Claims, 4 Drawing Sheets

METHOD AND APPARATUS FOR DETECTING SURFACE CONTAMINATION IN A WELD AREA

FIELD OF THE INVENTION

The present invention generally relates to the detection of surface contaminants during welding, and more specifically, to an apparatus/method that accurately and efficiently detects contamination by monitoring the welding voltage.

BACKGROUND OF THE INVENTION

In the manufacturing of cans having a three-piece construction, a thin walled metal sheet is rolled into a cylinder to create the body portion of the container. The body portion is rolled such that the two longitudinal edges of the sheet overlap. A pair of welding electrodes are used to seam weld the overlapping edge portions to create an open ended cylinder. Metal ends are affixed to the two open ends of the cylinder (e.g., via a seaming operation) to complete the production of the can.

Many three-piece cans are used to contain various types of food products. As such, the interior surfaces of the can are coated with a lacquer or some other surface coating to prevent the food products from contacting the metal surfaces of the can. During production of the cans, the lacquer is applied to the metal surface of the container-body prior to the above-described rolling and seam welding operations. In this process of applying the lacquer, all but the overlapping edge portions of the body of the container are coated. The edge portions are not coated with lacquer in order to provide a metal to metal interface for the welding operation.

During the application of the lacquer to the body portion of the container, lacquer may be inadvertently dripped onto or other surface contaminants may be present on the two longitudinal edge portions. When the body portion of the container is rolled into a cylinder, these surface contaminants may remain on the surfaces to be welded or, more specifically, they may become sandwiched between the overlapping edge portions. The surface contamination may create a potential hazard when the two longitudinal edge portions are welded because the contaminated areas increase the electrical resistance encountered by the welding electrodes.

Some seam welding systems employ a control system which attempts to provide a constant current to the welding electrodes during the welding process which is affected by varying the voltage. As such, the welding voltage may vary according to the electrical resistance encountered by the welding electrodes as they advance along the overlapping longitudinal edge portions of the container body. If an increased resistance is encountered during welding, such as due to the presence of a surface contaminant in the weld area, the voltage applied to the welding tip is increased in order to maintain a constant current. Conversely, if a decreased resistance is encountered during welding, the voltage applied to the welding tip is decreased to attempt to maintain a constant current. These control systems monitor the current, and when the current drops due to an increased resistance, the voltage is increased in an attempt to maintain a constant current for welding. Once the welding electrodes move off of the area of increased resistance, the electrodes encounter an area of lower resistance where the current then increases. Since the known control systems monitor the current, they are unable to detect the need to lower the voltage, and thereby the current before advancing beyond the contaminated area. As such, when the system does reduce the voltage to return the current to the desired level, the welding electrode has already received a potentially high current. In some cases, this dramatic increase in current may causes damage to the welding electrodes. If the welding electrode is damaged, the manufacturing line must be stopped in order to replace or repair the electrodes. In the manufacturing of cans, it is undesirable to stop the manufacturing line because high costs are incurred due to losses in productivity.

SUMMARY OF THE INVENTION

The present invention relates generally to the detection of contamination in a weld area. An application of the present invention includes a contamination system/method for the manufacture of cans (i.e. three piece cans used for containing food products).

A first aspect of the present invention is directed to identifying surface contamination during welding. First and second portions of metal are disposed so as to create an overlapping region. The first and second portions of metal may actually be two separate pieces of metal, or alternatively, the first and second portions of metal could also be opposing portions of a single piece of metal. For instance, the overlapping region could be created by rolling a single piece of sheet metal into an open ended cylinder, for example, to define a container body having two open ends.

The overlapping region is welded together by directing energy to at least one welding electrode and advancing this welding electrode(s) along the overlapping region. The welding electrode(s) may be a welding roller which is rolled along the overlapping region. A pair of welding electrode rollers may be utilized with these rollers being disposed on a top and bottom surface of the overlapping region.

The method of the first aspect of the present invention monitors for the presence of surface contamination in the overlapping region. This monitoring for contamination allows such contamination to be detected before the welding electrode(s) is advanced beyond any such contamination. This feature is desirable in the event that steps are taken to maintain a substantially constant current through the weld area, such as by adjusting the voltage upon a change in the resistance, which may be an additional step employed with this first aspect.

Generally, a substantially constant current is desirable throughout the welding operation in order to maintain the integrity of the weld due to fluctuations in the quality and the thickness of the metal sheets. Furthermore, dirt or other contaminants, such as lacquer which is often used to coat the inside of container bodies, may become lodged between or located on the metal portions. Such contamination increases the impedance encountered by the welding electrode(s) during welding of the overlapping metal portions. In maintaining a substantially constant current, the voltage applied across the overlapping metal portions is allowed to vary with the changes in impedance that are encountered by the welding electrode. The voltage is increased when an increased impedance is encountered in order to maintain the current at a substantially constant level, whereas the voltage is decreased when a lower impedance is encountered in order to maintain the current at a substantially constant level.

As noted above, the variation of the voltage applied across the overlapping metal portions is an important factor in detecting contamination in the weld area. Therefore, the first aspect of the present invention may include a further step of monitoring the voltage that is applied to the welding electrode. When the voltage increases above a predetermined value, the first aspect of the present invention may include a step of diverting the electrical energy away from the welding electrode. The predetermined value is generally a voltage level that indicates that the welding electrode(s) has encountered an area of contamination. The diverting step may further include a step of directing the electrical energy to at least one silicon control rectifier.

When the welding electrode(s) encounters an area of contamination, the voltage will increase while the welding electrode(s) is directly over the contamination. When the voltage is monitored as in this first aspect, the electrical energy may be directed away from the welding electrode (s) when the voltage increases above a certain level. Therefore, the electrical energy may be directed away from the welding electrode(s) before the welding electrode advances beyond the area of contamination. It is a key advantage of this first aspect of the present invention that the electrical energy is directed away from the welding electrode(s) before the electrode advances beyond the area of contamination. If this were not the case, after the welding electrode(s) passes the area of contamination, the continued application of a high voltage would generate a high current due to the now lower impedance. In some cases, such a high current may damage the welding electrode(s) and/or break the welding wire(s) being used. By monitoring the voltage levels, it is possible to identify areas of contamination and divert the electrical energy away from the welding electrode(s) before the electrode(s) sees such a high current which reduces the potential for the welding electrode(s) and/or the welding wire(s) becoming damaged with welding systems which utilize a constant current control system of some sort.

A second aspect of the invention is directed to an apparatus for evaluating electrical energy supplied to a welding unit and which may be employed to detect surface contamination during welding. The apparatus includes a voltage monitor for monitoring the magnitude of the voltage being supplied to the welding electrode from the electrical power supply. A comparator receives the magnitude of voltage from the voltage monitor and compares the voltage to a predetermined voltage level. The voltage being supplied to welding electrode will increase corresponding to an increase in resistance between the two pieces of metal being welded together. An increase in resistance may correspond to surface contamination on the metals that are being welded.

A switch is interconnected with the welding electrode(s), the comparator, and the electrical power supply. In the event that the voltage being supplied to the welding electrode(s) increases above the predetermined level, the comparator directs the switch to divert electrical power from the welding electrode(s). In one embodiment, the electrical power is diverted to at least one silicon control rectifier. In another embodiment, the electrical energy is diverted to a plurality of silicon control rectifiers connected in parallel. The electrical energy is diverted to silicon control rectifiers because of their ability to absorb a relatively high amount of energy in a short amount of time.

A third aspect of the present invention is directed to a method for evaluating the electrical energy supplied to the welding electrode(s). Electrical energy is supplied to the welding electrode(s) of a welding unit. For example, the electrical energy may be supplied by a transformer. Electrical energy is supplied to the welding electrode(s) to maintain a substantially constant current. In order to maintain a substantially constant current, the voltage supplied to the welding electrode(s) is allowed to vary according to the impedance that is encountered by the welding electrode(s) during a welding operation.

Surface contamination may be identified when the voltage increases above a predetermined value because surface contamination causes the impedance encountered by the welding electrode(s) to increase, and therefore, the voltage applied to the welding electrode(s) increases. In an effort to identify surface contamination during welding, the voltage supplied to the welding electrode(s) is monitored. The monitored voltage is compared to a predetermined voltage value. The predetermined voltage value corresponds to a voltage that is capable of causing a current that may damage the welding electrode(s) and/or any welding wire(s) which is being employed.

When the voltage level applied to the welding electrode(s) increases above the predetermined value, the electrical energy may be diverted from the welding electrode(s) and supplied to at least one silicon control rectifier. In a further step of the third aspect, the directing step may be terminated when the voltage level is smaller than the predetermined voltage level and the electrical energy may be directed back to the welding electrode(s) for further welding.

DETAILED DESCRIPTION

Figure 1:
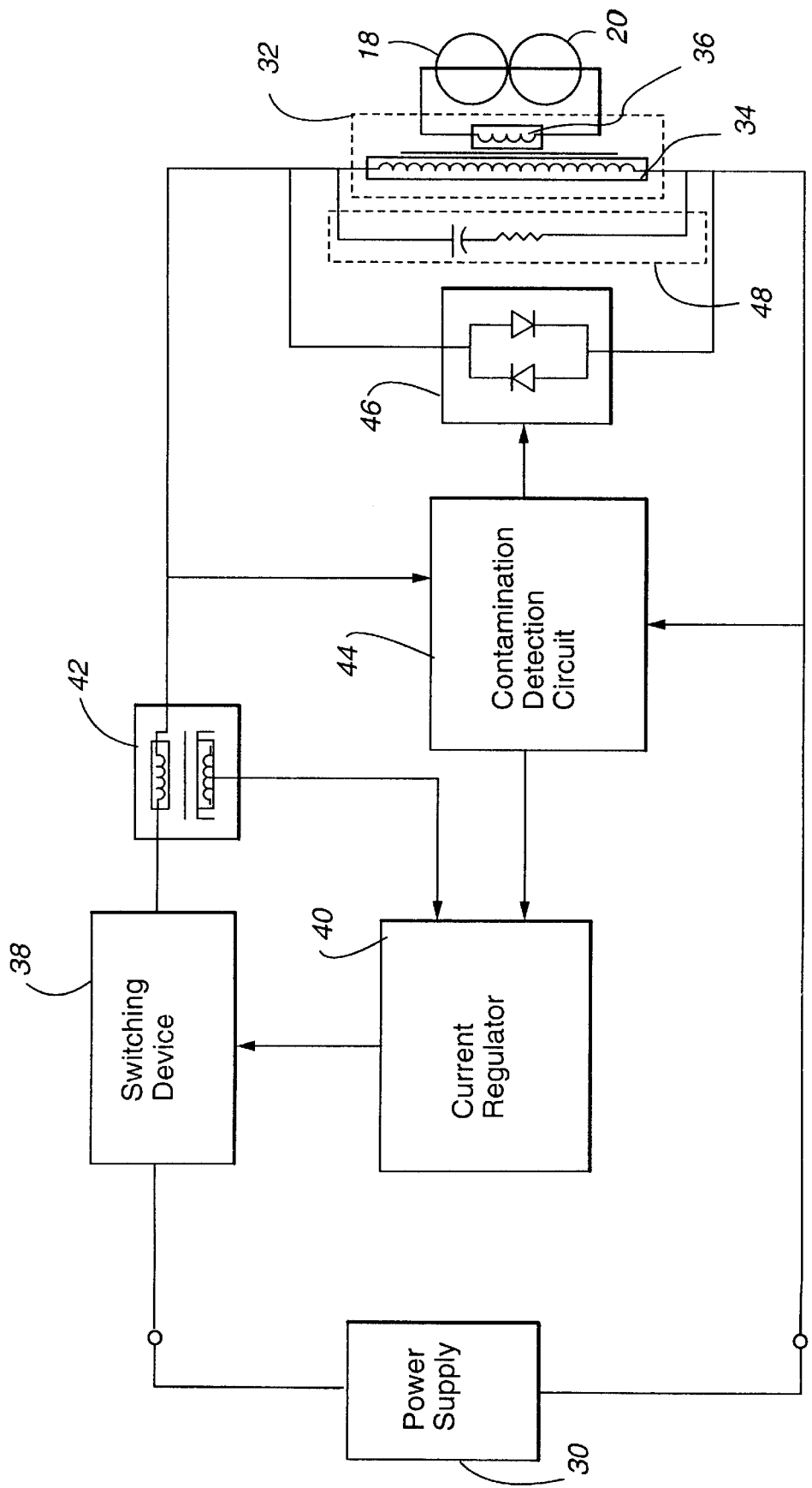
FIG. 1 is one embodiment of the welding power supply and monitoring circuit of the present invention.

The present invention will be described in relation to the accompanying drawings which assist in the illustration of its various features. As shown in FIG. 1, the present invention relates to an apparatus/method for identifying areas of contamination during welding to prevent the welding current from increasing to a level that could damage to the welding electrodes and/or break/damage the welding wire. In FIG. 1, the welding circuit, generally, includes a power supply 30 electrically connected to welding transformer 32 to supply power to the welding rollers 18 and 20. A switching device 38 is interconnected between the power supply 30 and the welding transformer 32. A contamination detection circuit 44 detects the impedance encountered by the welding rollers 18 and 20 and transmits the impedance values to the current regulator 40. The switching device 38 connected to and working in cooperation with a current regulator 40 and a current transformer 42 ensures that a constant current is supplied from the power supply 30 to the welding rollers 18 and 20 based on the impedance values sent to the current regulator 40. The contamination detection circuit 44 also monitors the voltage supplied to the welding transformer 32 from the power supply 30. If the contamination detection circuit 44 detects an increase in the voltage above a predetermined voltage level, the contamination detection circuit 44 directs at least one silicon control rectifier 46 to short circuit the primary winding 34 of the welding transformer 32. This short circuiting of the welding transformer 32 is performed because the welding voltage typically increases above a predetermined voltage level in the presence of a contaminated area, as will be further explained below.

Figure 2:
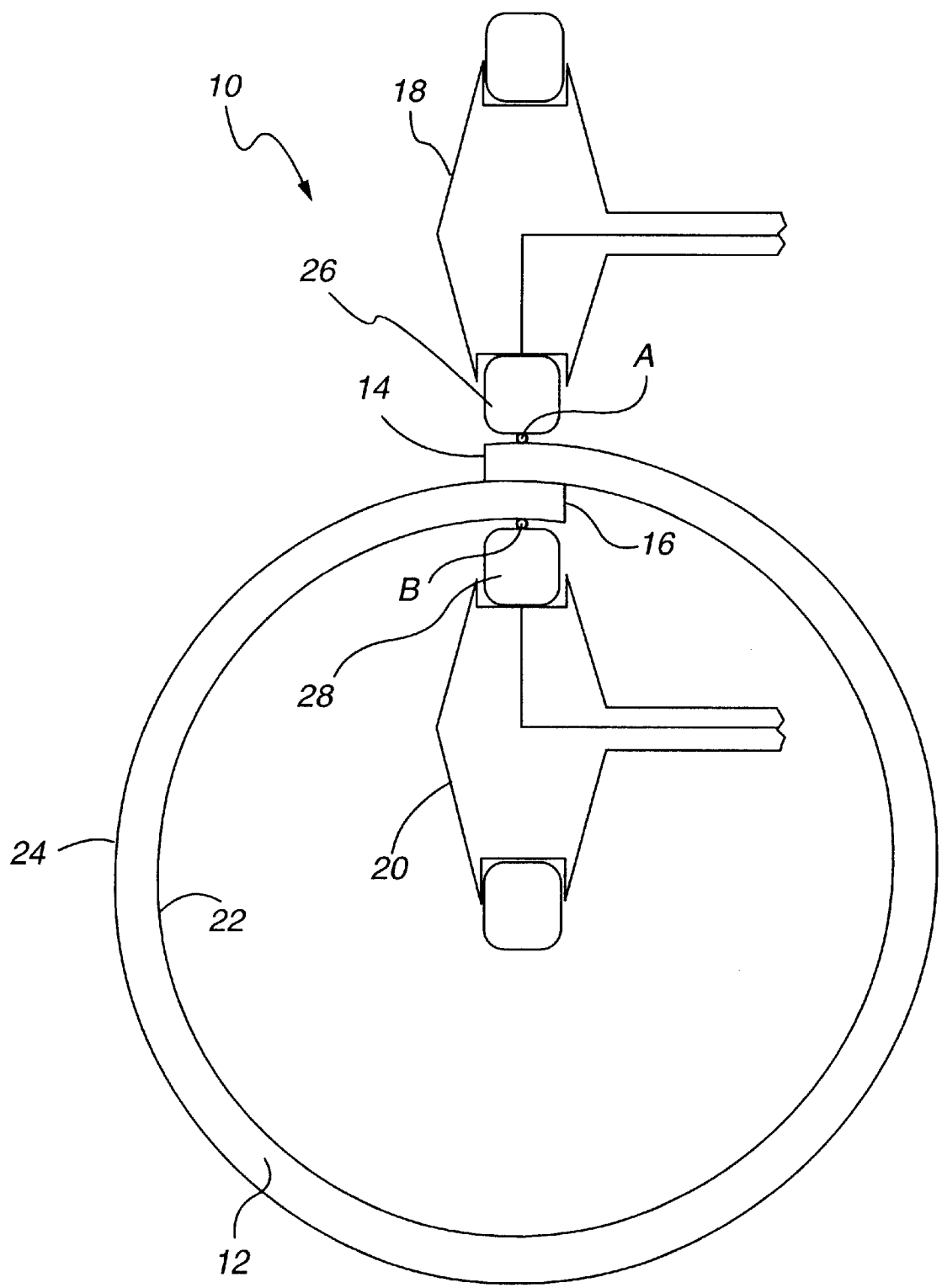
FIG. 2 is a cross sectional view of one embodiment of a welding apparatus of the present invention.

Typically, cans used to contain food products are constructed in three-pieces. Referring to FIG. 2, a piece of sheet metal is rolled into an open ended cylinder configuration having overlapping end portions 16 and 14 to form a can body 12. In one embodiment, the piece of sheet metal can be either square or rectangular. The can body 12 is seam welded along the overlapping end portions 16 and 14. To complete the manufacturing process of the can, can ends are separately affixed to the two open ends of the can body 12.

The seam welding process used to connect the overlapping regions 16 and 14 of the can body 12 is of particular importance to the present invention and will be described in detail. Referring to FIG. 2, a welding apparatus 10 is used to weld the overlapping end portions 16 and 14 of the can body 12. In one embodiment, welding rollers 18 and 20 are rolled on an interior surface 22 and an exterior surface 24 in the area of the overlapping end portions 14 and 16 of the can body 12. Welding wires 26 and 28 are used to supply welding material to the welding rollers 18 and 20. In one embodiment, the wires 26 and 28 are copper wires.

A voltage is applied to the welding rollers 18 and 20 and a current is induced between points A and B, in FIG. 2, to initiate the welding procedure. Typically, in a welding procedure, electrical energy is provided between the overlapping portions 14 and 16 (points A and B) under substantially constant current conditions. A constant current ensures that a steady state current level is supplied to the weld area to produce a high quality welded bond between the metal pieces. Using a constant welding current, the voltage applied to points A and B, in FIG. 2, is allowed to fluctuate with the impedance level encountered by the welding rollers 18 and 20 in the area of the overlapping end portions 14 and 16 in order to maintain a constant current. The impedance in the area of the overlapping end portions 14 and 16 varies due to variations in quality and thickness of the metal to be welded. Furthermore, the impedance encountered by the welding rollers 18 and 20 may dramatically change when contamination is present, either on the surface of the metal or sandwiched between the overlapping metal portions 14 and 16. In the manufacturing of cans, contamination may take the form of dirt or other grime that is located positioned on the metal. In particular, in the manufacturing of can used to contain food products, a coating material, such as a lacquer, is applied the interior metal surface of the can to prevent the food products from contacting the bare metal surface. In some cases, the lacquer may be inadvertently dripped on the overlapping metal portion and, therefore, contaminate the weld area.

Figure 3:
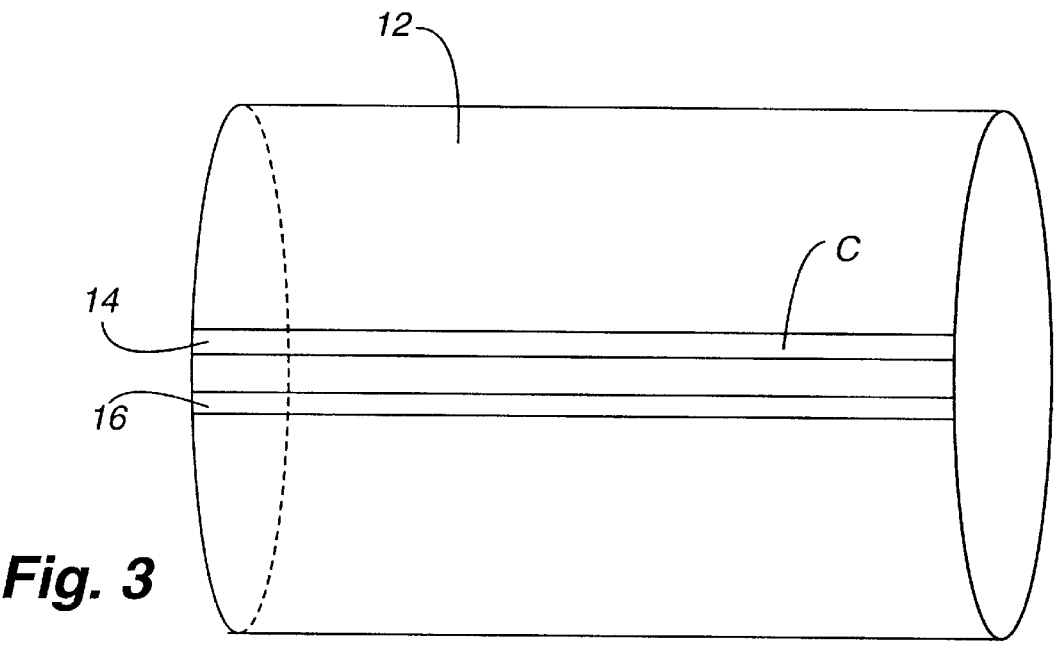
FIG. 3 is a perspective view of a can body after being rolled into an open ended cylinder configuration.
Figure 4:
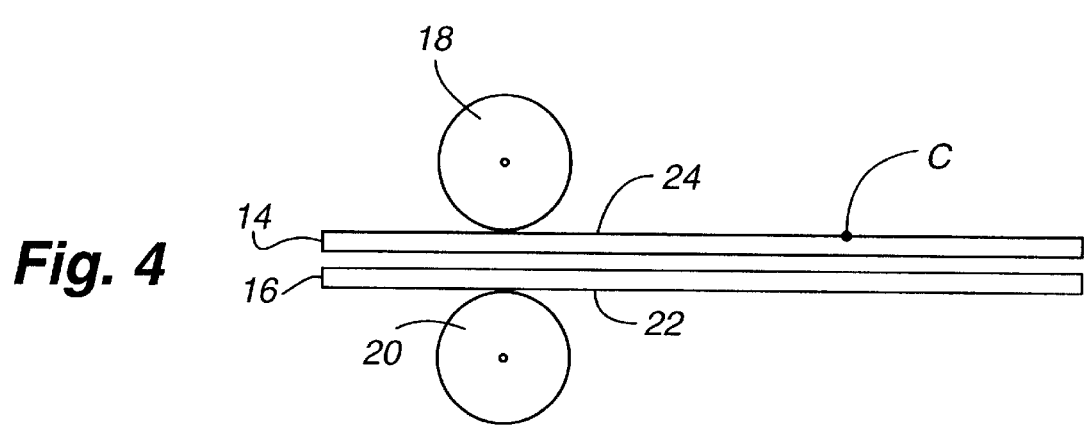
FIG. 4 is a cutaway side view of the welding apparatus along the welding area.
Figure 5:
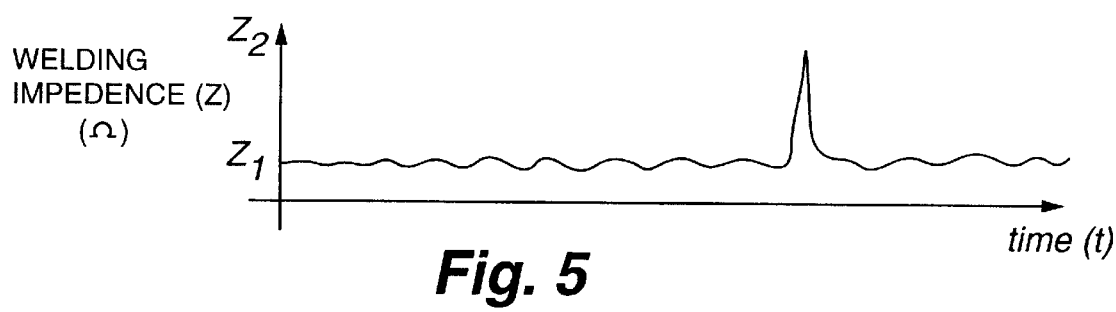
FIG. 5 is a welding impedance versus time plot showing the welding impedance encountered by the welding electrodes as the welding electrodes move along the welding area in time.

Referring to FIG. 3, contamination, C, located on the surface of the metal or sandwiched between the overlapping metal portion 14 and 16 of the can body 12, typically, increases the impedance encountered by the welding rollers 18 and 20. Referring FIG. 4, as previously explained, the welding rollers 18 and 20 move along the interior surface 22 and the exterior surface of the overlapping metal portions 14 and 16. During this movement, the welding rollers 18 and 20 may encounter contamination, C, in the welding area. In the non-contaminated areas, as shown in FIG. 5, the impedance encountered by the welding rollers 18 and 20 is $Z_1$. In one embodiment, the impedance $Z_1$ is 0.05 ohms. As the welding rollers 18 and 20 pass over the area of contamination, C, the impedance encountered by the welding rollers 18 and 20 increases to $Z_2$. Typically, the impedance $Z_2$ is higher than $Z_1$ and in some cases $Z_2$ is a very high value.

Figure 6:
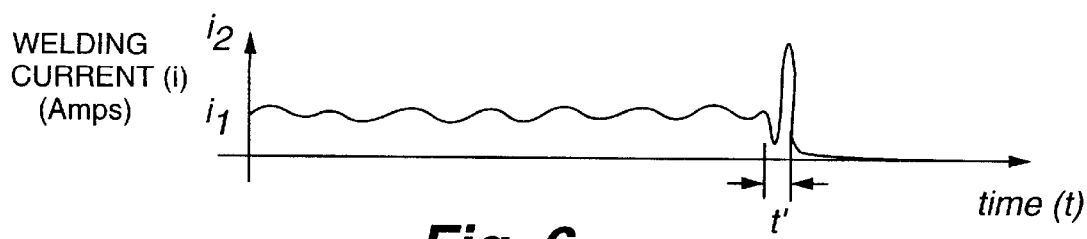
FIG. 6 is a welding current versus time plot showing the welding current supplied by the welding electrodes as the welding electrodes move along the welding area in time.

To maintain a constant current, the voltage supplied to the welding rollers 18 and 20 is allowed to fluctuate with reference to the changes in impedance. As shown in FIG. 6, a substantially constant welding current, $i_1$, is maintained through the welding area. In one embodiment, a substantially constant welding current, $i_1$, of 6000 amps is used to maintain a high quality weld of the overlapping portions 14 and 16. As the welding rollers 18 and 20 are over the area of contamination, C, the welding current remains constant at $i_1$ due to fluctuation of the welding voltage.

In the prior art devices that monitor the current applied between the overlapping regions 14 and 16, and as shown in FIG. 6, after the welding rollers 18 and 20 pass the area of contamination, the voltage is not able to adjust quickly to the decrease in welding impedance. Therefore, in response to the high voltage level and the low welding impedance, the welding current increases rapidly to $i_2$. In some cases, the welding current, $i_2$, may be so high that the welding wires 26 and 28, as shown in FIG. 1, are broken because due to the high current.

In one embodiment of the present invention as explained above, under normal welding operation, the typical welding impedance, $Z_1$, is about 0.05 ohms and a typical welding current is about 6000 amps. Therefore, using Ohm's law the voltage, $V_1$, required for this operation is 300 volts. When the welding rollers 18 and 20 encounter an area of contamination, the welding impedance may increase, for example, to $Z_2$, where $Z_2$ is about 0.067 ohms. To maintain a constant welding current, $i_1$, of 6000 amps, in the presence of the contamination, the welding voltage, $V_2$, must increase to 400 volts.

In the prior art devices that monitor the current applied between the overlapping regions 14 and 16, after the welding rollers 18 and 20 pass the area of contamination, the welding impedance almost instantaneously decreases to $Z_1$ or 0.05 ohms. This rapid decrease in impedance occurs in a time of t' where t' is about 0.5 ms, as shown in FIG. 6. In this amount of time, a typical power supply does not have time to react and decrease the voltage, accordingly. Therefore, in these prior art devices, a voltage of $V_2$, or 400 volts, is applied to a welding area having an impedance of 0.05 ohms. According to Ohm's law, the welding current increases to a level, $i_2$, where $i_2$ is about 8000 amps, as shown in FIG. 6. Typically, the welding wires 26 and 28, shown in FIG. 2, cannot carry a current level of 8000 amps, and, therefore, in these prior art devices, the welding wires 26 and 28 would break, creating an open circuit. When the welding wires 26 and 28 would break, the welding apparatus 10 would have to be dismantled to replace the welding wires 26 and 28 and repair any other damage, such as melting of the welding rollers 18 and 20 and/or the welding wires 26 and 28. To dismantle the welding apparatus 10, the manufacturing assembly line would be stopped which incurred many economic losses, such as monetary losses due to lack of production and losses due to maintenance costs.

The present invention includes an apparatus/method for detecting areas of contamination during welding to prevent the economic losses mentioned above. Referring to FIG. 1, a power supply 30 is electrically interconnected to a welding transformer 32 to supply electrical power to the welding rollers 18 and 20 for welding. In one embodiment, the power supply 30 is capable of producing 300 volts at 400 hertz. The welding transformer 32, including a primary winding 34 and a secondary winding 36, is capable of increasing the power range of the power supply 30. In one embodiment, the welding transformer 32 is capable of dropping the voltage to 5 volts and supplying a 6000 amp current capacity to the welding rollers 18 and 20. A switching device 38 is interconnected between the power supply 30 and the welding transformer 32. The switching device 38 is also interconnected to a current regulator 40 and a current transformer 42, and the combination of these elements work in cooperation to maintain a constant current to the welding rollers 18 and 20. In this regard, a contamination detection circuit 44 monitors the impedance levels encountered by the welding rollers 18 and 20 and transmits this information to the current regulator 40. Using this impedance value, the current regulator 40 operates the switching device 38 and the current transformer 42 to supply a constant current level to the welding rollers 18 and 20 as the impedance fluctuates. A parallel compensation circuit 48 is connected in parallel configuration with the welding transformer 32. The parallel compensation circuit 48 delivers electrically stored energy from a previous welding cycle, in the form of a voltage increment, to the welding rollers 18 and 20 on the present welding cycle. In one embodiment, the parallel compensation circuit 48 includes the series connection of a capacitor and a resistor.

Figure 7:
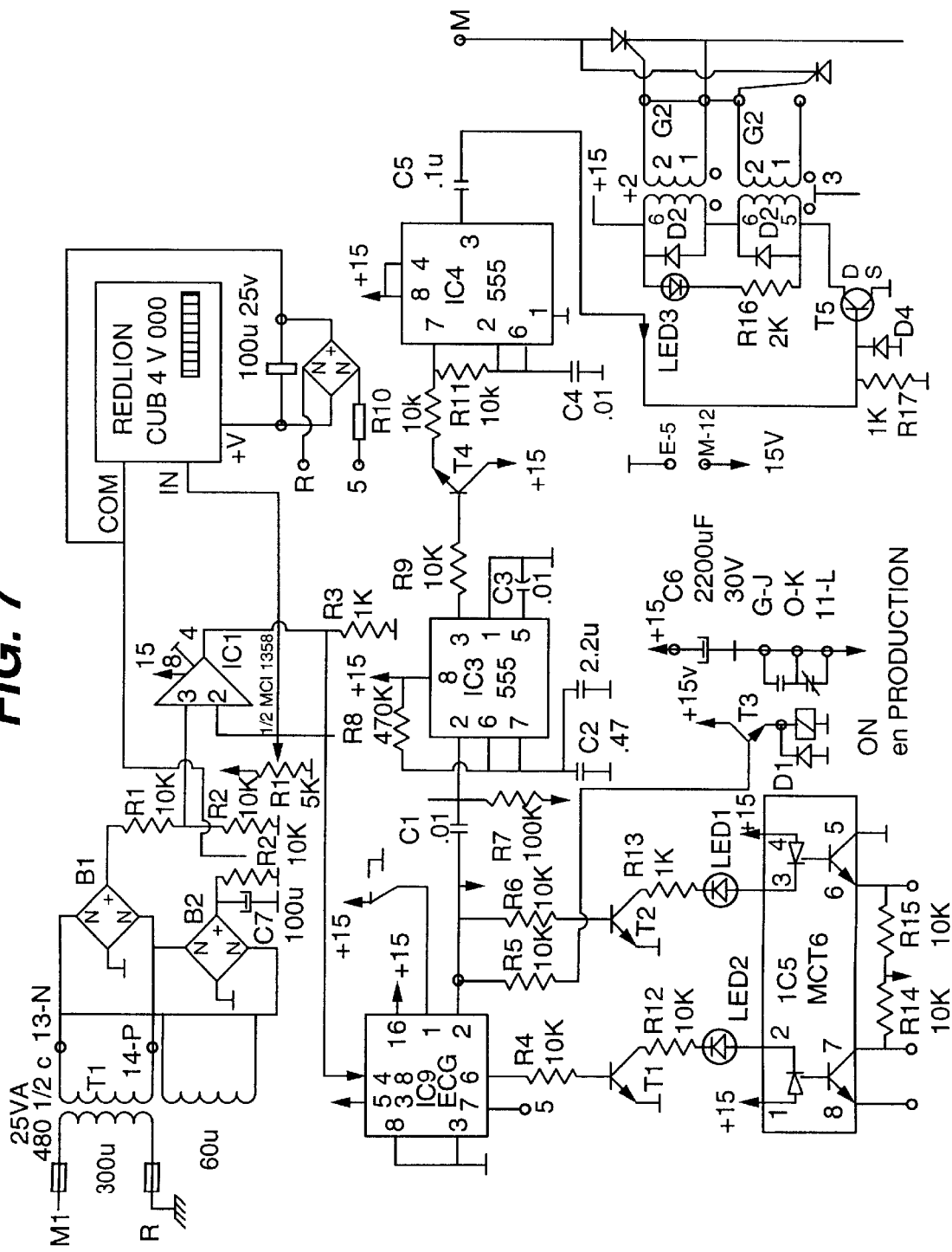
FIG. 7 is one embodiment of the contamination detection circuit.

The contamination detection circuit 44 is, further, connected in parallel configuration with the welding transformer 32 and, also, monitors the voltage supplied to the welding transformer 32. In FIG. 7, a circuit diagram of one embodiment of the contamination detection circuit 44 is illustrated. It should be appreciated that other circuit embodiments that perform the functions mentioned herein may be designed by those skilled in the art. As such, this disclosure encompasses all such similar circuit designs that perform the functions as described herein.

As explained earlier, an increase in welding voltage above a predetermined voltage level may indicate the presence of an area of contamination. When the voltage increases above a predetermined level, the contamination detection circuit 44 directs a short circuiting device 46 to short circuit the primary winding 34 of welding transformer 32. At the point where the voltage increases above the predetermined voltage level, the welding rollers 18 and 20 are directly above the area of contamination. By switching the current supplied between the overlapping areas 14 and 16 to the short circuit device when the voltage increases above the predetermined voltage level, electrical power can be diverted from the welding rollers 18 and 20 before the current increases to a level that is capable of causing damage to the welding wires 26 and 28 and/or the welding rollers 18 and 20. The short circuiting of the primary winding 34 essentially removes all electrical power from the welding rollers 18 and 20 and supplies that power to the short circuiting device 46. As such, when the welding voltage increases above the predetermined level, the electrical energy is removed from the welding rollers 18 and 20 before the welding current can increase to a level that may cause damage to the welding rollers 18 and 20 and/or the welding wires 26 and 28. In one embodiment, the short circuiting device 46 is the parallel combination of silicon control rectifiers (SCRs).

When the primary winding 34 of the welding transformer is short circuited, the can body 12 being welded is discarded and electrical power is redirected from the short circuit device 46 back to the welding transformer 32 to continue the welding process on a new can body. During the short circuiting process, the short circuit device 46 may be damaged due to the high current levels that flow through the device 46. Damage to the short circuit device 46 is preferred over damage to the welding apparatus because the short circuit device 46 can quickly be replaced without subjecting the production line to extend periods of non-production, thus, reducing the economic losses incurred.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for welding first and second pieces of metal together with a welding system comprising a first electrode, comprising the steps of:

disposing said first piece of metal relative to said second piece of metal to define an overlapping region said overlapping region defining a longitudinal axis having a first end and a second end;

welding said first and second pieces of metal together in at least said overlapping region, said welding step comprising the steps of:

directing energy to said first electrode to at least assist in said welding step;

advancing said first electrode along said overlapping region from said first end toward said second end while continuing to direct energy to said first electrode, to define a welding period which begins at a first time when said first electrode is substantially positioned at said first end said method further comprising the steps of:

monitoring for an existence of contamination in said overlapping region between said first and second pieces of metal, said monitoring step being performed at least after said first time and continuing throughout at least a substantial portion of said welding period;

identifying said existence of said contamination during said monitoring, while said first electrode is disposed over said surface contamination, said identifying step using said monitoring step; and in response to identifying said existence of said contamination, diverting said energy from said first electrode.

2. A method, as claimed in claim 1, wherein:

said disposing step comprises rolling a piece of sheet metal into a generally cylindrical configuration to define a container body having first and second open ends, wherein said first and second pieces of metal comprise first and second edge portions of said piece of sheet metal, and wherein said welding step comprises seam welding.

3. A method, as claimed in claim 1, wherein:

said first electrode comprises a first roller and said advancing step comprises rolling said first roller along said overlapping region.

4. A method, as claimed in claim 3, wherein said welding system comprises a second electrode comprising a second roller, wherein said first roller interfaces with said first piece of metal and said second roller interfaces with said second piece of metal, wherein said first and second rollers are disposed in opposing relation, and wherein said advancing step comprises simultaneously advancing said first and second rollers along said overlapping region to substantially maintain said opposing relation of said first and second rollers.

5. A method, as claimed in claim 1, wherein:
    said monitoring step comprises monitoring a voltage associated with said directing energy step.

6. A method, as claimed in claim 5, wherein:
    said identifying step is performed when said voltage associated with said directing energy step is at least as great as a first predetermined value.

7. A method, as claimed in claim 1, wherein:
    said diverting step comprises directing said energy to at least one silicon control rectifier.

8. A method, as claimed in claim 1, wherein said directing energy step uses a source voltage, said method further comprising the step of:
    maintaining a substantially constant current through said first and second pieces of metal in said overlapping region substantially throughout said welding step, wherein said maintaining step comprises adjusting a magnitude of said source voltage associated with said directing energy step, and wherein said monitoring step comprises monitoring said magnitude of said source voltage.

9. A method, as claimed in claim 1, further comprising the steps of:
    applying a coating material to a first surface of a piece of sheet metal, wherein said first and second pieces of metal comprise first and second edge portions of said piece of sheet metal with said first and second edge portions intended to be substantially free of said coating material, wherein said disposing step comprises rolling said piece of sheet metal into a generally cylindrical configuration to define a container body having first and second open ends and having said first surface defining an interior of said container body, and wherein said identifying step identifies an existence of said coating between said first and second edge portions.

10. An apparatus for evaluating electrical energy supplied to a welding electrode of a welding unit from an electrical power source during a welding period when said welding electrode is being advanced along a welding line from a first end to a second end, said apparatus comprising:
    a voltage monitor for monitoring, during said welding period, a magnitude of voltage supplied to the welding electrode of the welding unit;
    a comparator for receiving said magnitude of voltage supplied to the welding electrode from said voltage monitor and for comparing said voltage to a predetermined magnitude of voltage; and
    a switch interconnected with said comparator, said electrical power source and said welding electrode for diverting, during said welding period, said electrical energy being supplied to said welding electrode when said magnitude of said voltage is larger than said predetermined voltage magnitude.

11. An apparatus as claimed in claim 10, wherein said switch comprises at least one silicon control rectifier.

12. An apparatus as claimed in claim 10, wherein said switch comprises a plurality of silicon control rectifiers connected in parallel configuration.

13. An apparatus as claimed in claim 10, wherein said welding electrode comprises welding rollers.

14. An apparatus as claimed in claim 10, wherein said welding unit comprises a seam welder.

15. A method for evaluating electrical energy supplied to a welding electrode of a welding unit during a welding period when said welding electrode is being advanced along a welding line from a first end toward a second end, comprising the steps of:
    supplying electrical energy to the welding electrode of a welding unit;
    monitoring, during said welding period, a magnitude of a voltage signal supplied to the welding electrode of the welding unit;
    comparing said magnitude of said voltage signal to a predetermined voltage magnitude; and
    directing the electrical energy away from the welding electrode of the welding unit, during said welding period, when said magnitude of said voltage signal is larger than said predetermined voltage magnitude.

16. A method according to claim 15, wherein said directing step comprises:
    diverting said electrical energy from the welding electrode of the welding unit to at least one rectifier when said magnitude of said voltage signal is larger than said predetermined voltage magnitude.

17. A method according to claim 15, wherein said directing step further comprises:
    preventing electrical energy from being supplied to said welding electrode, wherein said electrical energy is capable of causing damage to said welding electrode.

18. A method according to claim 15, further comprising:
    terminating said directing step, and thereafter redirecting said electrical energy to said welding electrode when said magnitude of said voltage signal is smaller than said predetermined voltage magnitude.

19. A method as claimed in claim 15, wherein said supplying step comprises:
    maintaining a substantially constant current to the welding electrode of the welding unit.

20. A method as claimed in claim 15, wherein said directing step comprises:
    diverting electrical energy from a transformer supplying electrical energy to the welding electrode of the welding unit when said magnitude of said voltage signal is larger than said predetermined voltage magnitude; and
    supplying the electrical energy from said diverting step to at least one silicon control rectifier.

* * * * *